United States Patent
Schürmann et al.

(10) Patent No.: US 9,217,482 B2
(45) Date of Patent: Dec. 22, 2015

(54) LEAF SPRING FOR MOTOR VEHICLES

(75) Inventors: Helmut Schürmann, Maxdorf (DE); Tobias Keller, Erzhausen (DE)

(73) Assignee: Muhr und Bender KG, Attendorn (DE)

( * ) Notice: Subject to any disclaimer, the term of this patent is extended or adjusted under 35 U.S.C. 154(b) by 0 days.

(21) Appl. No.: 13/634,387

(22) PCT Filed: Mar. 9, 2011

(86) PCT No.: PCT/EP2011/053572
§ 371 (c)(1),
(2), (4) Date: Sep. 21, 2012

(87) PCT Pub. No.: WO2011/110611
PCT Pub. Date: Sep. 15, 2011

(65) Prior Publication Data
US 2013/0049271 A1 Feb. 28, 2013

(30) Foreign Application Priority Data
Mar. 12, 2010 (DE) .......................... 10 2010 015 951

(51) Int. Cl.
*B60G 11/10* (2006.01)
*F16F 1/368* (2006.01)
*F16F 1/18* (2006.01)

(52) U.S. Cl.
CPC .............. *F16F 1/3686* (2013.01); *B60G 11/10* (2013.01); *B60G 2204/121* (2013.01); *F16F 1/187* (2013.01); *F16F 1/368* (2013.01)

(58) Field of Classification Search
CPC ... B60G 11/10; B60G 2204/121; F16F 1/027; F16F 1/18; F16F 1/185; F16F 1/187; F16F 1/3686; F16F 1/368
USPC ................. 267/229, 246, 36.1, 47, 260, 158; 280/124.17, 124.175, 124.176, 686, 280/124.163
See application file for complete search history.

(56) References Cited

U.S. PATENT DOCUMENTS 1,188,821 A * 6/1916 Peck .............................. 267/227
1,952,718 A    3/1934 Lee
(Continued)

FOREIGN PATENT DOCUMENTS

| | | |
|---|---|---|
| CH | 319824 A | 2/1957 |
| EP | 0132048 A1 | 1/1985 |
| FR | 2570032 A1 | 3/1986 |

OTHER PUBLICATIONS

International Search Report, Application No. PCT/EP2011/053572, Dated Oct. 5, 2011.

*Primary Examiner* — Thomas Irvin
(74) *Attorney, Agent, or Firm* — MacMillan, Sobanski & Todd, LLC

(57) ABSTRACT

The invention relates to a leaf spring (1) for motor vehicles, which is made of a fiber-reinforced synthetic material and can absorb potentially occurring lateral forces and transfer them to a leaf spring receiving device, comprises a first end (2) and a second end (3), which can each be fixed in a leaf spring receiving device in a torsion-proof and non-displaceable manner, and a bending joint section (11), which can compensate for a change in length of a resilient section (8) of the leaf spring (1) during a load-induced deformation of the resilient section (8). The leaf spring (1) comprises a first spring limb (5) and a second spring limb (6) which are connected to each other via a transition section (7). In a non-loaded state, both the first spring limb (5) and the second spring limb (6) are approximately planar and disposed at an angle relative to each other. The first spring limb (5) forms the resilient section (8). The bending joint section (11) contains the second spring limb (6). The second spring limb (6) is shorter than the first spring limb (5) and oriented approximately perpendicularly to the first spring limb (5). The leaf spring (1) is integrally produced from unidirectional prepregs having a duroplastic or thermoplastic matrix by means of a pressing method.

23 Claims, 1 Drawing Sheet

(56) References Cited

U.S. PATENT DOCUMENTS

Figure 1:
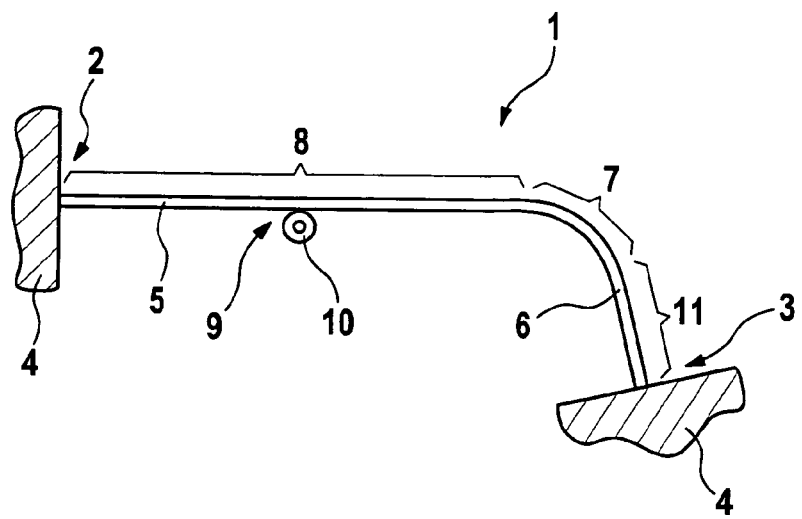

| Patent No. | | Date | Inventor | Class |
|---|---|---|---|---|
| 3,490,758 A | * | 1/1970 | Foster | 267/47 |
| 3,785,673 A | * | 1/1974 | Harbers et al. | 280/124.101 |
| 3,945,625 A | * | 3/1976 | Duchemin | 267/47 |
| 4,575,057 A | * | 3/1986 | Robertson | 267/47 |
| 4,749,534 A | * | 6/1988 | Robertson | 264/136 |
| 4,771,997 A | * | 9/1988 | Haldenwanger et al. | 267/260 |
| 4,832,320 A | | 5/1989 | Scowen et al. | |
| 4,883,261 A | * | 11/1989 | Zamitter | 267/158 |
| 4,905,972 A | | 3/1990 | Scowen | |
| 4,927,124 A | | 5/1990 | Spedding et al. | |
| 5,366,238 A | * | 11/1994 | Stephens | 280/124.116 |
| 5,887,881 A | * | 3/1999 | Hatch | 280/124.175 |
| 5,921,570 A | * | 7/1999 | Lie | 280/124.175 |
| 5,938,221 A | * | 8/1999 | Wilson | 280/124.163 |
| 5,950,971 A | * | 9/1999 | Koumbis et al. | 248/200 |
| 6,129,369 A | * | 10/2000 | Dudding | 280/124.175 |
| 6,485,040 B1 | * | 11/2002 | Dudding | 280/124.175 |
| 6,530,562 B1 | * | 3/2003 | Sutton et al. | 267/36.1 |
| 6,641,156 B1 | * | 11/2003 | Barlas et al. | 280/124.175 |
| 7,722,065 B2 | * | 5/2010 | Platner et al. | 280/124.175 |
| 8,434,747 B2 | * | 5/2013 | Dudding et al. | 267/36.1 |
| 2003/0025258 A1 | * | 2/2003 | Collyer et al. | 267/269 |
| 2006/0103103 A1 | * | 5/2006 | Land et al. | 280/124.163 |
| 2007/0040309 A1 | * | 2/2007 | Tolani | 267/36.1 |
| 2007/0108717 A1 | * | 5/2007 | Stoesz et al. | 280/124.175 |
| 2008/0252033 A1 | | 10/2008 | Platner et al. | |
| 2009/0115157 A1 | * | 5/2009 | Platner et al. | 280/124.176 |
| 2009/0200721 A1 | | 8/2009 | Kobelev et al. | |
| 2009/0302513 A1 | * | 12/2009 | Enomoto et al. | 267/39 |
| 2011/0127753 A1 | * | 6/2011 | Griffin | 280/686 |

* cited by examiner

LEAF SPRING FOR MOTOR VEHICLES

CROSS-REFERENCE TO RELATED APPLICATIONS

This application is the National Phase of International Application PCT/EP2011/053572 filed Mar. 9, 2011, which designated the U.S. That International Application was published in English under PCT Article 21(2) on Sep. 15, 2011 as International Publication Number WO 2011/110611A2. PCT/EP2011/053572 claims priority to German Application No. 10 2010 015 951.4 filed Mar. 12, 2010. Thus, the subject nonprovisional application also claims priority to German Application No. 10 2010 015 951.4 filed Mar. 12, 2010. The disclosures of both applications are incorporated herein by reference.

The invention relates to a leaf spring for motor vehicles, made of fibre-reinforced plastics, wherein the leaf spring is capable of accommodating potential lateral guiding forces and transferring same to a leaf spring receiving device.

For many years, large numbers of leaf springs have been used in the suspension systems of motor vehicles. Their purpose is to ensure that the motor vehicle wheels follow road surface unevennesses without the entire motor vehicle being subjected to excessive acceleration rates. However, as compared to other spring devices, the leaf springs, which can be produced very cost-effectively, provide a low rate of suspension comfort and only a limited improvement in driving safety, so that, at present, leaf springs are commonly used only in trucks and small transport vehicles.

Leaf springs for motor vehicles are usually provided in a curved shape and often designed such that the leaf spring, which has a curved shape in a load-free condition, is bent into a substantially planar or flat shape by a predetermined load. By changing the load, the leaf spring is then deflected or deformed from this approximately straight shape.

As a result of bending the leaf spring into a straight condition, the originally curved leaf spring is extended so that the two ends of the leaf spring bend away from one another, with the resulting lever arms of the applied forces increasing. This is the reason why the spring rate, respectively returning force, is lower in the case of a deformation from the pretensioned straight shape compared to a deformation from the load-free curved shape. The restoring force which decreases with an increasing deformation from the load-free curved condition towards the straight condition of the leaf spring and which counteracts a further deformation can also be described by a degressive force displacement curve.

The leaf spring is often designed and arranged such that, as a result of the force of the weight of the fully loaded motor vehicle, it is deformed approximately into a straight or planar shape. As a result it is possible to prevent the leaf spring which, in the case of a fully loaded motor vehicle is already curved to a considerable extent, from being over-stretched and possibly damaged, or, even in the case of even light road surface unevennesses to prevent the leaf spring abutting a spring travel delimiting device. However, in an unloaded condition of the motor vehicle, the leaf spring is curved back into it starting shape, with the reset force, respectively spring rate increasing. In the unloaded condition, the spring effect of the then curved leaf spring is always too strong or too hard, so that the driving dynamics and driving comfort are restricted considerably.

In order to be able to compensate the change in length of the leaf spring caused by the deformation of the leaf spring from a curved, unloaded condition into a substantially planar, loaded condition, the leaf spring, at both ends, commonly comprises spring eyes. Via the spring eyes, the leaf spring can be fixed at holding pins which are displaceably and usually pivotably supported in the longitudinal direction, respectively in the direction of extension of the leaf spring. If the length of the leaf spring is changed due to a load-related deformation of the leaf spring, the change in length of the leaf spring can be compensated for by the displacement of the holding pins. As the leaf spring has to comprise spring eyes and as the support of such leaf springs requires displaceable holding pins, such a method of fixing the leaf springs to a motor vehicle or the like is complicated and results in high production costs.

However, a change in length will also result in a change in the effective lever arms of the leaf spring and, simultaneously in the returning forces generated by the leaf spring. In the utilisation-relevant deformation region, most single leaf springs comprise a characteristic degressive force displacement curve. However, in the suspension region of motor vehicles, a suspension with a characteristic degressive force displacement curve is often disadvantageous and undesirable. In order to achieve a progressive force displacement curve it is also possible to use leaf springs which are composed of a plurality of spring leaves which are designed and connected to one another in a suitable way, respectively which are arranged in the form of a spring leaf composite. However, the use and assembly of multi-leaf leaf springs results in additional complexity and high costs.

It is therefore the object of the present invention to design a leaf spring of the initially mentioned type such that it is possible to produce, with the lowest possible production costs and expenditure, a leaf spring which has the best possible spring characteristics for motor vehicles and can be fixed to motor vehicles.

In accordance with the invention, the objective is achieved in that a first end and a second end of the leaf spring can each be fixed in a moment-resistant and non-displaceable way in a leaf spring receiving device and that the leaf spring comprises a bendable joint portion which can compensate for a change in length of a spring portion of the leaf spring, in the case of a load-induced deformation of the spring portion. By fixing the two ends of the leaf spring in a moment-resistant (moment-proof) and non-displacable (displacement-resistant) way at a motor vehicle for instance, a load-related deformation of the leaf spring does not only generate a bending load transversely to the longitudinal direction of the leaf spring, but also a tensile load in the longitudinal direction of the leaf spring. Said tensile load is generated by a change in length of the spring portion (resilient portion) deformed transversely to the longitudinal direction and can be compensated for by a deformation of the bendable joint portion, which deformation is adapted to said change in length.

Without a bendable joint portion, even a slight deflection or deformation of the leaf spring under load would be counteracted by a very high returning force. A pronounced change in the length of the leaf spring would be prevented because of the displacement-resistant fixing of the leaf spring in the leaf spring receiving device, so that with a firmly clamped-in leaf spring, such as it is known from the state of the art, no advantageous suspension characteristics could be achieved. In contrast hereto, in the case of the inventive design of the leaf spring, a change in length in the spring portion of the leaf spring—which change in length is forcibly generated in the case of a load-induced deformation transversely to the longitudinal extension of the spring portion—can be compensated for by an adapted deformation of the bendable joint portion, wherein the bendable joint portion of the leaf spring being deformed against a reset force. Because of the shape and design of the bendable joint portion, the reset forces acting against a load-induced deformation of the spring portion and thus the spring characteristics of the leaf spring can be predetermined within a wide range. More particularly, it is also possible to predetermine for the leaf spring a progressive spring rate and a progressive load displacement curve, such as it is advantageous for the use of a leaf spring in motor vehicles.

According to a preferred embodiment it is proposed that the leaf spring comprises a first spring leg and a second spring leg which are connected to one another via a transition portion. In an unloaded condition, the two spring legs can be approximately planar. It has been found that spring legs which substantially extend planar, respectively straight, can be produced cost-effectively and in a space-saving way. In contrast to a normally continuously curved embodiment of a leaf spring known from the state of the art, it is nevertheless possible to achieve good suspension characteristics for a leaf spring.

It is also conceivable and advantageous with a view to providing an improved driving comfort that at least one spring leg comprises a shape which is curved in at least some portions. Provided a suitable design of the curvature of the spring leg, it can be ensured that the restoring forces responsible for the spring effect are caused by a bending load during the deformation of the curved spring leg as well as by a tensile load caused by a change in length of the deformed spring leg. Initially under a low load and a predominantly occurring bending load, the load displacement curve of such a leaf spring can have a flat shape, which results in a pleasantly soft suspension effect. Subsequently, when the load increases, a super-proportionally increasing percentage of the restoring force can be caused by the tensile force, so that the load displacement curve rises more and more steeply, thus providing a progressive characteristic curve.

A bendable joint portion can easily be provided at the leaf spring in that the first spring leg and the second spring leg are arranged at an angle relative to one another. In the transition portion connecting the two spring legs, the leaf spring, as a result, extends in a curved way. Because the two spring legs are aligned so as to form an angle relative to one another, a change in length of one spring leg can be compensated for by a bending deformation of the other spring leg. Also, the leaf spring can be designed so as to be deformable in the transition portion. Alternatively, the transition portion could also be provided in the form of a stiff, dimensionally stable transition element, which at both ends, is articulatably supported at the spring legs.

According to one embodiment of the inventive idea, it is proposed that the first spring leg forms the spring portion. In the central region of the first spring leg, there is advisably arranged the effective connection with the associated wheel of the motor vehicle, so that, if a load is applied to the spring portion, the first spring leg is forced to change its length. Such a change in the length of the first spring leg has to be compensated for at least partially by a bend in the second spring leg which is arranged at an angle relative to the first spring leg. The bendable joint portion of the leaf spring preferably comprises the second spring leg. In view of its deformability and in view of its advantageous length changing effect on the spring portion, the transition portion, too can be associated with the bendable joint portion of the leaf spring.

Tests have shown that it is advantageous for most applications if the second spring leg is shorter than the first sparing leg. Also if there exists a comparatively long spring travel which is predetermined or admitted for a load-induced deformation of the spring portion transversely to the longitudinal direction of same, the length of the spring portion changes comparatively little and can also be compensated for by a short bendable joint portion. For the suspension characteristics of the leaf spring, the ratio of the preferably different lengths of the two spring legs as well as the design of the transition portion between the spring legs are particularly important.

In addition, it can be advisable if at least the first spring leg is slightly curved because with a completely planar spring leg, the characteristic spring curve would be to progressive for most applications.

The longer the short second spring leg is relative to the longer first spring leg, the lower the restoring force of same which acts against a load-induced deformation, respectively change in length of the first spring leg. In such a case, the load displacement curve of the leaf spring is correspondingly flatter, at least at the beginning.

According to one embodiment of the invention it is proposed that the second spring leg is arranged approximately perpendicularly relative to the first spring leg. The second spring leg can also have an obtuse angle relative to the first spring leg. It is also conceivable for the second spring leg to be arranged parallel relative to the first spring leg, in which case a change in length of the first spring leg, whose deformation is load-induced, has to be ensured, substantially, by an accordingly adapted deformation of the transition portion which, as a result, is clearly curved. The second spring leg is then unable to greatly contribute to a length adjustment.

According to a preferred embodiment it is proposed that in the region of the transition portion and optionally in the region of the first spring leg, the leaf spring comprises a necking. If at least one necking is provided, the restoring forces which are decisive for the lateral guidance characteristics of the leaf spring and which are generated if the vehicle is displaced into a transverse position relative to the spring-suspended wheels, can easily and effectively be predetermined and influenced.

According to a particularly advantageous embodiment of the invention it is proposed that the leaf spring is produced in one piece. It is therefore avoided and becomes superfluous to join a plurality of individual leaves into one leaf spring and mount same. By providing the leaf spring in one piece, it is avoided to weaken the mechanical strength of the leaf spring by joining or fixing individual components to one another, nor are the spring characteristics adversely affected.

According to a simple and cost-effective production process it is proposed that the leaf spring is produced by a pressing process from uni-directional pre-impregnated fibres, so-called prepregs, with a duro-plastic or thermoplastic matrix. In this way it is possible to reliably and cost-effectively predetermine and achieve the desired shape and design of the leaf spring in the unloaded condition.

Figure 2:
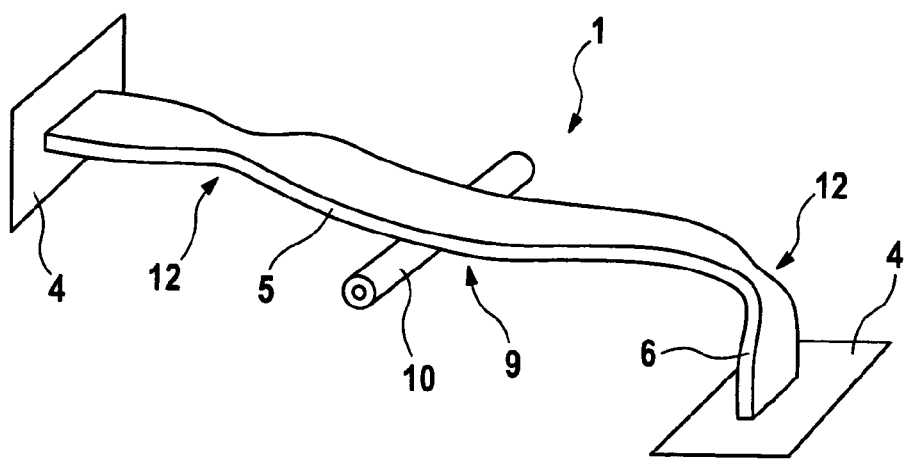

Embodiments of the invention will be explained in greater detail below and illustrated in the drawings wherein FIG. 1 shows a diagrammatic illustration of an inventive leaf spring and FIG. 2 is a perspective illustration of a leaf spring for a motor vehicle.

The leaf spring 1 shown in FIG. 1 by way of example and only diagrammatically is fixed at a first end 2 and at a second end 3 in a moment-resistant (torque-proof) and non-displaceable way to a leaf spring receiving device 4 which is not shown in greater detail. A deformation or displacement of the first end 2 or of the second end 3 relative to the respective associated leaf spring receiving device 4 is made impossible by the moment-resistant and non-displaceable fixing method.

The leaf spring 1 comprises a first spring leg 5 and a second spring leg 6 which are connected to one another by a transition portion 7. In the transition portion 7 the leaf spring 1 extends in a curved way, so that the second spring leg 6 is arranged at an angle relative to the first leg 5. In the embodiment shown schematically in FIG. 1, the second spring leg 6 comprises an angle of less than 90°, respectively approximately 80° relative to the first spring leg 5.

The first spring leg 5 forms a spring portion 8 (resilient portion 8) whose central region 9 is operatively connected to a hub or wheel axle 10 and, if loaded by the hub 10, is deflected and deformed transversely to the longitudinal direction of the first spring leg 5. As a result of said load, the central region 9 of the spring portion 8 is forced to deform. In consequence, the length of same is shortened, and one end of the spring portion 8, which end faces the transition portion 7, is pulled and displaced towards the other end which is fixed at the fixing device 4 in a non-displaceable way.

The change in the length of the spring portion 8 is compensated for by a bending deformation of the second spring leg 6 which, together with the transition portion 7 which is also slightly deformable, forms the bendable joint portion 11.

The embodiment of the leaf spring 1 which is approximately realistically shown in FIG. 2 comprises a short second spring leg 6 and a first spring leg 5 which is more than 10 times longer. The second spring leg 6 is arranged approximately at a right angle relative to the first spring leg 5. In the central region 9, the first spring leg 5 comprises a slightly convexly curved shape which is advantageous for the suspension characteristics. If the first spring leg 5 is deformed by a load into a completely planar condition, even up to a comparable, but concave curvature, there occurs only a slight change in length which, due to a deformation of the bendable joint portion 11, can be compensated for without a higher tensile load and without respective returning forces, respectively.

In both the transition portion 7 and an opposed end region of the first spring leg 5, there is provided a necking 12 which advantageously affects the lateral guiding characteristics of said leaf spring 1.

The leaf spring 1 is produced integrally out of fibre-reinforced plastics. By pressing uni-directional prepregs with a duro-plastic or thermo-plastic matrix, the leaf spring 1 can be produced in the two shapes illustrated by way of example in the two Figures in a simple and cost-effective way. As a result of the short dimensions of the second spring leg 6 relative to the first spring leg 5 arranged approximately perpendicularly relative thereto it is possible to forcibly achieve a high restoring force which acts against a deformation and/or change in length of the first spring leg 5 and of the spring portion 8, respectively, and predetermines hard suspension characteristics.

The first end 2 and the second end 3 of the leaf spring 1 do not have to comprise spring eyes, but can be produced cost-effectively for example in the form of tongue-shaped end regions of the substantially band-shaped, curved leaf spring 1. It is possible to do without using the spring eyes in the ends 2, 3 of the leaf spring, which spring eyes have to be produced at great expense. More particularly—as it is regarded as almost imperative to produce the leaf spring 1 from fibre-reinforced composite plastics—it is possible to achieve an extremely low overall weight of the leaf spring 1 and, respectively, of the suspension device comprising the leaf spring 1, for a motor vehicle.

The invention claimed is:

1. A combined motor vehicle and leaf spring assembly comprising:

a motor vehicle including first and second leaf spring receiving devices; and a leaf spring including a first spring leg and a second spring leg that is shorter than the first spring leg, wherein:

the first spring leg and the second spring leg are arranged at an angle relative to each other and are connected with each other via a transition portion such that the leaf spring is substantially L-shaped, the first spring leg includes a first end that is fixed in the first leaf spring receiving device so as to be non-displaceable relative to the motor vehicle in a longitudinal direction of the leaf spring, and the second spring leg includes a second end that is fixed in the second leaf spring receiving device so as to be non-displaceable relative to the motor vehicle in the longitudinal direction of the leaf spring, such that a load-related deformation of the leaf spring generates both a bending load transversely to the longitudinal direction of the leaf spring and a tensile force in the longitudinal direction of the leaf spring, and the first spring leg includes a region arranged between the first end and the second end that is connected to a hub or a wheel axle of the motor vehicle, wherein at least one of the first end and the second end of the leaf spring is fixed in a moment-resistant way in the respective leaf spring receiving device.

2. A leaf spring according to claim 1, wherein the first spring leg forms a spring portion of the leaf spring and the second spring leg forms a bendable joint portion of the leaf spring that is configured to, upon a load-induced deformation of the spring portion, compensate for a change in displacement of a spring portion end facing the bendable joint portion.

3. A leaf spring according to claim 2, wherein, in a load-free condition, the first spring leg and the second spring leg are substantially planar.

4. A leaf spring according to claim 2, wherein the second spring leg is arranged substantially perpendicularly relative to the first spring leg.

5. A leaf spring according to claim 1, wherein, in the region of the transition portion and optionally in the region of the first spring leg, the leaf spring comprises a necking.

6. A leaf spring according to claim 1, wherein the leaf spring is produced from one piece.

7. A leaf spring according to claim 1, wherein the leaf spring is produced by a pressing process out of uni-directional prepregs with a duro-plastic or thermo-plastic matrix.

8. The assembly according to claim 1, wherein both of the first end and said second end of the leaf spring are fixed in a moment-resistant way in the respective leaf spring receiving devices.

9. The assembly according to claim 1, wherein the second spring leg extends downwardly relative to the first spring leg and the hub or wheel axle.

10. A combined motor vehicle and leaf spring assembly comprising:

a motor vehicle including a first leaf spring receiving device and a second leaf spring receiving device; and a leaf spring made of fiber-reinforced plastics and including a first end fixed to the first leaf spring receiving device so as to be non-displaceable relative to the motor vehicle in a longitudinal direction of the leaf spring and a second end fixed to the second leaf spring receiving device so as to be non-displaceable relative to the motor vehicle in the longitudinal direction of the leaf spring such that a load-related deformation of the leaf spring generates a bending load transversely to the longitudinal direction of the leaf spring and a tensile force in the longitudinal direction of the leaf spring, wherein at least one of the first end and the second end of the leaf spring is fixed in a moment-resistant way in the respective leaf spring receiving device;

the leaf spring further including a spring portion and a bendable joint portion which are arranged at an angle relative to each other and connected to each other via a transition portion;

wherein the spring portion has a region arranged between the first end and the second end of the leaf spring that is connected to a hub or wheel axle of the motor vehicle; and wherein the bendable joint portion is configured to compensate for a change in displacement of an end of the spring portion that faces the bendable joint portion upon a load-related deformation of the spring portion.

11. The assembly according to claim 10, wherein the leaf spring comprises a first spring leg and a second spring leg which are connected to one another via the transition portion.

12. The assembly according to claim 11, wherein, in a load-free condition, the first spring leg and the second spring leg are substantially planar.

13. The assembly according to claim 11, wherein the first spring leg and the second spring leg are arranged at an angle relative to one another.

14. The assembly according to claim 11, wherein the first spring leg forms the spring portion.

15. The assembly according to claim 11, wherein the bendable joint portion comprises the second spring leg.

16. The assembly according to claim 11, wherein the second spring leg is shorter than the first spring leg.

17. The assembly according to claim 11, wherein the second spring leg is arranged substantially perpendicularly relative to the first spring leg.

18. The assembly according to claim 11, wherein, in the region of the transition portion and optionally in the region of the first spring leg, the leaf spring comprises a necking.

19. The assembly according to claim 10, wherein the leaf spring is produced in one piece.

20. The assembly according to claim 10, wherein the leaf spring is produced by a pressing process out of uni-directional prepregs with a duro-plastic or thermo-plastic matrix.

21. The assembly according to claim 10, wherein both of the first end and said second end of the leaf spring are fixed in a moment-resistant way in the respective leaf spring receiving devices.

22. The assembly according to claim 10, wherein the bendable joint portion extends downwardly relative to the first spring leg and the hub or wheel axle.

23. A combined motor vehicle and leaf spring assembly comprising:

a motor vehicle including first and second leaf spring receiving devices; and a leaf spring including a first spring leg and a second spring leg that is shorter than the first spring leg, wherein, in a load-free condition, the first spring leg and the second spring leg are substantially planar, wherein:

the first spring leg and the second spring leg are arranged at an angle relative to each other and are connected with each other via a transition portion that is shorter than the second spring leg such that the leaf spring is substantially L-shaped, the first spring leg includes a first end that is fixed in the first leaf spring receiving device so as to be non-displaceable relative to the motor vehicle in a longitudinal direction of the leaf spring, and the second spring leg includes a second end that is fixed in the second leaf spring receiving device so as to be non-displaceable relative to the motor vehicle in the longitudinal direction of the leaf spring, such that a load-related deformation of the leaf spring generates both a bending load transversely to the longitudinal direction of the leaf spring and a tensile force in the longitudinal direction of the leaf spring, and the first spring leg includes a region arranged between the first end and the second end that is connected to a hub or a wheel axle of the motor vehicle, wherein at least one of the first end and the second end of the leaf spring is fixed in a moment-resistant way in the respective leaf spring receiving device.

* * * * *